(12) United States Patent
Wentling

(10) Patent No.: US 6,382,411 B1
(45) Date of Patent: May 7, 2002

(54) BEVERAGE CONTAINER WITH STORAGE POCKETS

(76) Inventor: James T. Wentling, 111 Bridgewater Ct., Jacksonville, NC (US) 28546

(*) Notice: Subject to any disclaimer, the term of this patent is extended or adjusted under 35 U.S.C. 154(b) by 0 days.

(21) Appl. No.: 09/538,780

(22) Filed: Mar. 30, 2000

(51) Int. Cl.[7] .......................... B65D 77/00; A45C 11/20
(52) U.S. Cl. ........................ 206/217; 206/549; 426/115
(58) Field of Search ................................. 206/217, 219, 206/222, 549, 541; 426/112, 115, 116, 119, 120; 220/902, 592.17

(56) References Cited

U.S. PATENT DOCUMENTS

| | | | | |
|---|---|---|---|---|
| 1,798,339 A | * | 3/1931 | Soulis | 206/217 |
| 2,794,545 A | * | 6/1957 | Olson | 206/217 |
| 3,127,984 A | * | 4/1964 | Hertzog | 206/217 |
| 3,278,014 A | * | 10/1966 | Thornton | 206/217 |
| 3,766,975 A | * | 10/1973 | Todd | 220/592.17 |
| 4,040,537 A |   | 8/1977 | Edwards | |
| 4,278,172 A | * | 7/1981 | Ghebresillassie | 206/549 |
| 4,642,999 A | * | 2/1987 | Justice | 220/902 |
| 4,934,525 A | * | 6/1990 | Robinson | 206/217 |
| 5,048,734 A |   | 9/1991 | Long | |
| 5,310,564 A | * | 5/1994 | Kimm | 426/115 |
| 5,320,249 A |   | 6/1994 | Strech | |
| 5,431,276 A | * | 7/1995 | Lialin | 206/222 |
| 5,674,546 A |   | 10/1997 | Barnes et al. | |
| 5,722,558 A |   | 3/1998 | Thompson | |
| 5,727,678 A |   | 3/1998 | Chen | |
| D396,780 S |   | 8/1998 | Villarreal, Jr. et al. | |
| D399,707 S |   | 10/1998 | Villarreal, Jr. et al. | |

FOREIGN PATENT DOCUMENTS

EP 0076224 * 4/1983 ................. 206/222

* cited by examiner

*Primary Examiner*—Bryon P. Gehman
(74) *Attorney, Agent, or Firm*—MacCord Mason PLLC

(57) ABSTRACT

A beverage container is constructed with storage pockets for use in storing and providing ready access to beverage ingredients, such as coffee, tea, sugar or sweetener, creamer, and the like. The container includes a reservoir with a beverage cavity; the reservoir being formed of a cylindrical side wall with upper and lower rims, a base extending across the lower rim of the side wall, and an annular cap attached to the upper rim of the cylindrical side wall. Hinged, latchable beverage ingredient carriers are positioned on opposite sides of the cylindrical side wall. Each carrier has a curved wall with a plurality of beverage ingredient pockets on the inner surface of the wall. The container may include elongated vertical mounting member attached to the side wall for use in hinging and latching the carriers, and a handle that extends outwardly from one of the mounting members.

12 Claims, 3 Drawing Sheets

US 6,382,411 B1

BEVERAGE CONTAINER WITH STORAGE POCKETS

BACKGROUND OF THE INVENTION (1) Field of the Invention

The present invention relates generally to a drinking container for holding a beverage, and in particular to a beverage container that includes storage compartments to hold condiments and other items used in beverage preparation.

(2) Description of the Prior Art

Drinking containers, such as cups or mugs, are manufactured in a variety of shapes and sizes, depending on the intended user, non-functional design features, and the type of beverage to be consumed. Containers for indoor use are frequently molded for glass or porcelain, while containers designed for use in an outdoor environment or other locations where the container may be subjected to abuse or temperature extremes are frequently made of molded plastic.

These containers are designed to hold beverages in a reservoir having a cavity defined by the continuous side wall and bottom wall of the reservoir. The container may also include a handle that projects outwardly from one side wall. The reservoir side wall and, if desired, the bottom wall, may be formed with spaced inner and outer wall sections, with the space between the walls serving to insulate the beverage. This interior space may be filled with a foamed plastic, such as Styrofoam.

When beverages are consumed, especially in an outdoor environment, the user may have a convenient supply of the beverage, e.g., coffee or tea, or of water to prepare the beverage, but may not have convenient access to beverage ingredients, such as condiments and other items needed to prepare the beverage. These beverage ingredients may include, depending on the available liquid and the personal tastes of the user, instant coffee, tea bags, bullion, sugar, powdered creamer, etc. Other items, such as stirring sticks, may also be desired.

These beverage ingredients may be carried separately by the user, e.g., in a pocket of the user's clothing. However, the items are often forgotten, and may be lost or soiled. Therefore, there is a need for a convenient way to store beverage ingredients so that they will be readily and conveniently available to a user wishing to prepare a beverage.

SUMMARY OF THE INVENTION

The present invention is directed to a beverage container that includes storage compartments or pockets for beverage ingredients. As used herein, the term "beverage ingredients" includes one or more of the following items: instant coffee, tea bags, cocoa, bullion, sugar or sweetener, powdered creamer, Tabasco, and incidentals, such as stirring sticks. Specifically, the container of the invention is comprised of a beverage reservoir having a continuous side wall, and a plurality of compartments or pockets on the exterior of the reservoir for holding beverage ingredients, so that the ingredients are readily accessible when the container is to be used for beverage consumption. The container may also include other components, such as a handle.

Preferably, the container is comprised of a reservoir and a beverage ingredient carrier. The reservoir is formed of a cylindrical reservoir side wall having upper and lower edges or rims, and a reservoir bottom wall extending across the lower edge of the side wall, with the side and bottom walls defining an interior cavity for holding a beverage. The beverage ingredient carrier extends around a portion of the exterior of the reservoir, and includes a curved, carrier wall with inner and outer surfaces, and a plurality of beverage ingredient holders or pockets carried on the inner surface of the carrier wall.

Preferably, the beverage material pockets are secured to the inner surface of the carrier wall, and may be integrally molded with the wall. The pockets may have concave inner walls that correspond to the radius of curvature of the outer surface of the reservoir side wall.

In order to insulate the beverage reservoir cavity, the reservoir side wall may be formed of continuous outer and inner wall sections that are separated by an insulation space. The insulation space may be filled with air, a styrene or urethane foam, or can be evacuated. The bottom wall that extends across the lower edges of these side wall sections to form the beverage cavity may also be insulated.

In a preferred embodiment, one end of the beverage ingredients carrier is hinged to the reservoir side wall, and the other end of the carrier includes a latch to secure the carrier to the reservoir wall. As a result, the carrier can be secured against the reservoir wall in a closed position to store the beverage ingredients, or unlatched and moved to an open position to expose the pockets for insertion and removal of beverage ingredients.

The container may include two beverage ingredient carriers instead of a single carrier, with each wall extending approximately one-half way around the reservoir. In this embodiment, each carrier is hinged at one end and latched at the other end to permit opening and closing. The hinges may be of the "living" hinge type, which are molded integrally with the carriers.

Thus, a preferred container of a "mug" design may be comprised of an insulated cylindrical, reservoir side wall having upper and lower edges, an annular cap covering the upper edge of the side wall, a base including a bottom wall extending across the lower edge of the reservoir side wall, and first and second beverage ingredient carriers hinged to the reservoir side wall. A first elongated mounting member may be included to secure the hinged ends of the carriers to the reservoir wall. A second elongated mounting member may be included to latch the latch ends of the carriers to the reservoir wall. These mounting members may be vertically positioned on opposite sides of the container. A handle is attached to the second mounting member and extends outwardly from the reservoir.

The insulated reservoir side wall is comprised of a cylindrical inner wall section with a first diameter, an cylindrical outer wall section having a circular outer wall surface with a second diameter greater than the first diameter, and an insulation space between the inner and outer wall sections. Each carrier is comprised of a curved exterior or carrier wall section forming the arc of a circle having a third diameter greater than the second diameter, and an interior wall, with pockets supported on the interior surface of the exterior wall. The pockets include concave inner faces and have a depth approximately equal to the difference in the distance between the reservoir side wall and the carrier wall, when the carrier is closed against the reservoir, so that the pocket concave inner faces abut the outer surface of the reservoir wall.

The annular cap and the base have circular outer walls, with the diameters of the cap and base walls being equal to the diameter of the circle formed by the outer surfaces of the carrier walls, so that the container exterior surface is of a uniform diameter. The annular cap includes a circular central opening that has a diameter equal to the inner diameter of the cylindrical reservoir side wall. The annular base may include a circular, upwardly projecting reservoir bottom wall section that also has a diameter equal to the diameter of the reservoir side wall interior opening, so that the bottom wall section can be snugly inserted into the inner wall section.

The container components will preferably be formed of injection molded plastic, which will then be joined in a known manner, such as by thermal welding or with a suitable adhesive.

Accordingly, one aspect of the present invention is to provide a beverage container comprising a reservoir having an exterior surface; and at least one beverage ingredient carrier attached to the reservoir, the carrier including a plurality of pockets for holding beverage ingredients.

Another aspect of the present invention is to provide a beverage container comprising a reservoir having a continuous cylindrical side wall with upper and lower rims, and a bottom wall extending across the lower rim of the side wall; and a first beverage ingredient carrier having an carrier wall with first and second ends, and inner and outer surfaces, and a plurality of beverage ingredient pockets on the inner surface of the carrier wall.

Still another aspect of the present invention is to provide a beverage container comprising a cylindrical side wall with upper and lower rims; a base extending across the lower rim of the side wall; an annular cap attached to the upper rim of the cylindrical side wall; a first elongated, vertical mounting member attached to the side wall; a second elongated, vertical mounting member attached to the side wall of the opposite side of the side wall from the second mounting member; first and second beverage ingredient carriers on opposite sides of the cylindrical side wall, each carrier having a carrier wall with a first end hinged to the first mounting member, and a second end releasably latched to the second mounting member, each of the carrier walls having an inner surface, with a plurality of beverage ingredient pockets on the inner wall surface.

These and other aspects of the present invention will become apparent to those skilled in the art after a reading of the following description of the preferred embodiment.

DETAILED DESCRIPTION OF THE INVENTION

Figure 1:
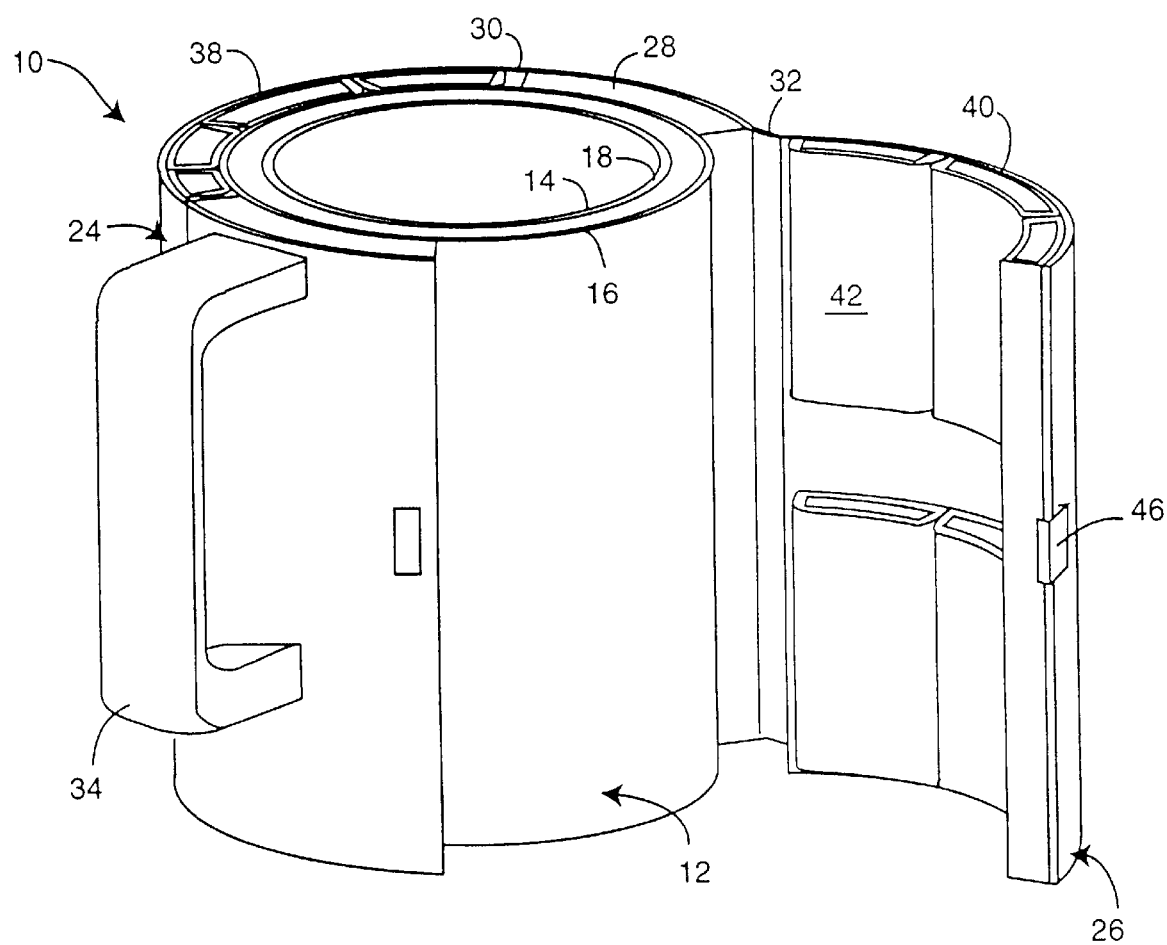
FIG. 1 is an exploded perspective view of the container of the preferred embodiment, with one of the carriers in the open position.
Figure 2:
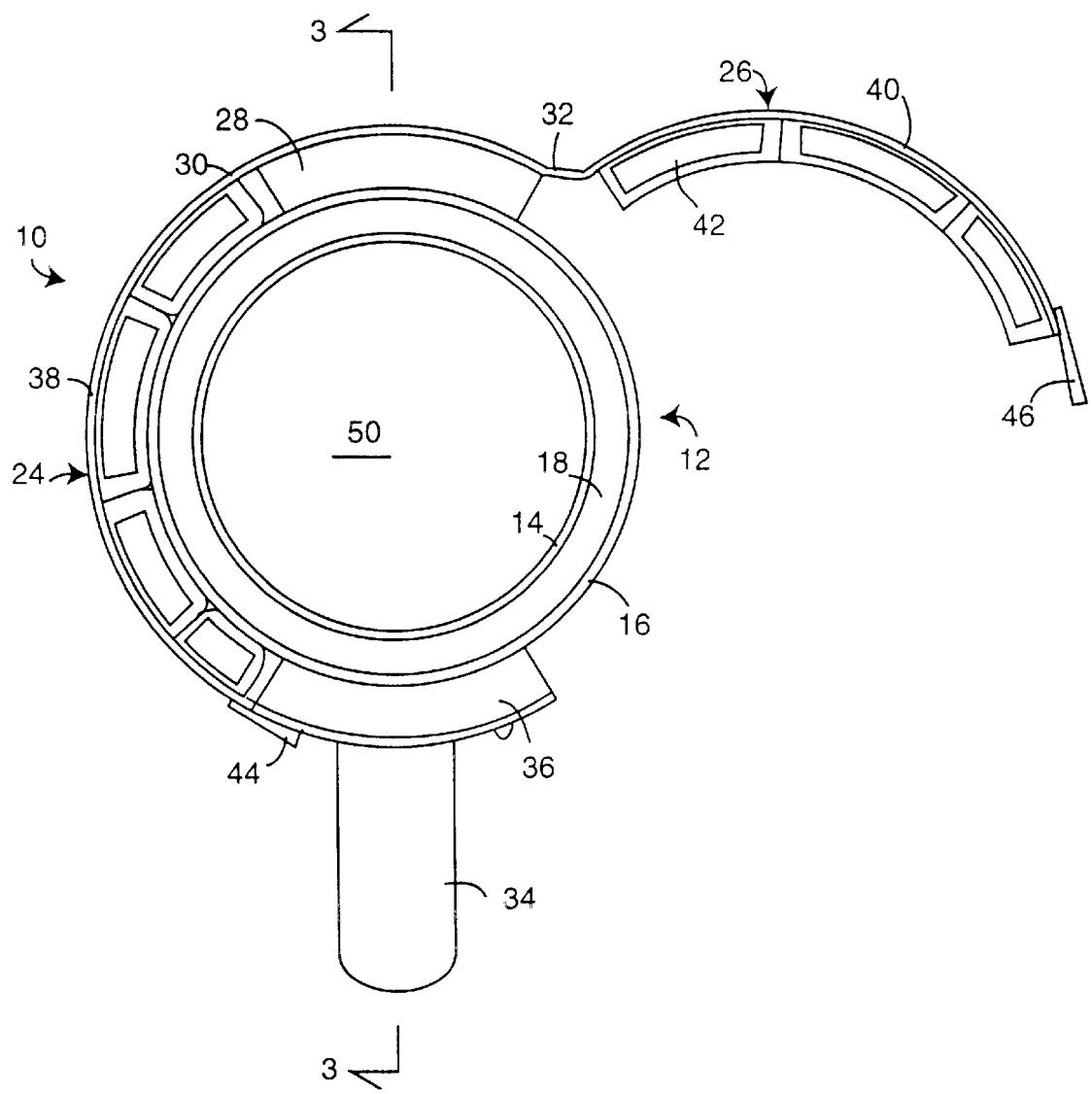
FIG. 2 is a sectional top view of the container.
Figure 3:
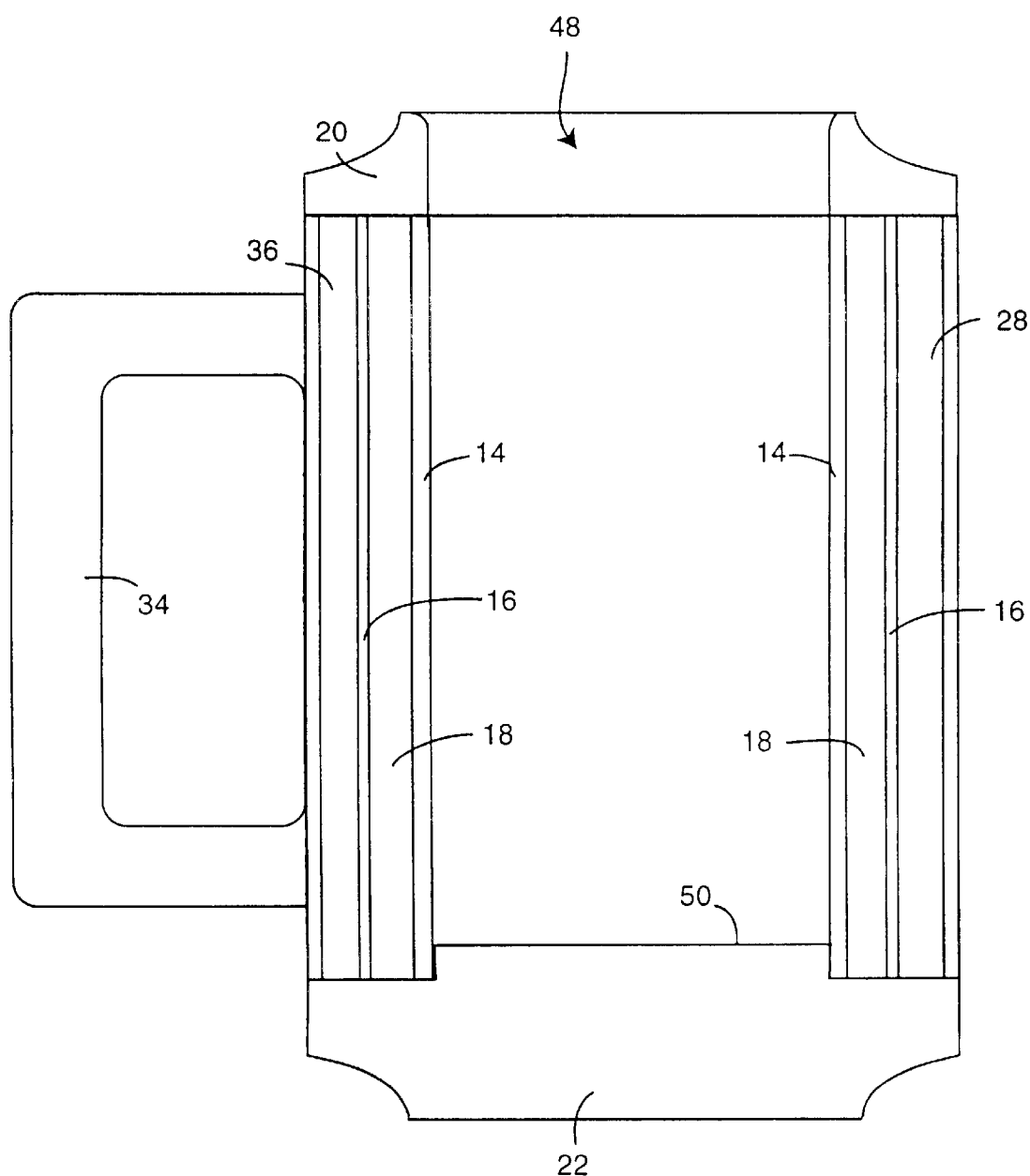
FIG. 3 is a sectional side view of the container.

In the following description, terms such as horizontal, upright, vertical, above, below, beneath, and the like, are used solely for the purpose of clarity in illustrating the invention, and should not be taken as words of limitation. The drawings are for the purpose of illustrating the invention and are not intended to be to scale.

The drawings illustrate a preferred embodiment of a container, generally 10, that includes a reservoir formed of an insulated reservoir side wall, generally 12, having an inner wall section 14, an outer wall section 16, and insulation material 18 between the wall sections 14 and 16. An annular cap 20 covers the upper edge of side wall 12, and a base 22 extends across the bottom edge of side wall 12. First and second carriers 24 and 26, respectively, are hinged to the reservoir side wall 12 with a first mounting member 28 by live hinges 30 and 32, respectively. A handle 34 is attached to reservoir side wall 12 with a second mounting member 36 secured to the exterior of side wall 12 opposite mounting member 28.

Carriers 24 and 26 are comprised of curved walls 38 and 40, respectively; each having a plurality of pockets 42 integrally formed on the inner wall surface. The depth of each pocket 42 is approximately equal to the spacing between the exterior surface of reservoir side wall 12 and the interior of the carrier wall upon which the pocket is supported, so that the concave face of the pocket is against the surface of wall 12 when the carrier is in the closed-position. Latches 44 and 46 are used to secure carriers 24 and 26, respectively, in their closed positions. Pockets 42 may be sized to received packets of beverage materials or extend along substantially the entire vertical dimension of the carrier wall to hold stirring sticks.

The diameters of annular cap 20 and base 22 are equal to the diameter of the combined exterior surfaces of carriers 24 and 26, so that a uniform surface is provided along the vertical dimension of container 10. Also, the inner surface of circular central opening 48 in cap 20 has the same diameter as the inner surface of reservoir wall section 12. Base 22 includes a central, upwardly projecting circular wall 50 that extends into the interior of wall 12 when container 10 is assembled to form, with wall 12, the beverage cavity.

Certain modifications and improvements will occur to those skilled in the art upon a reading of the foregoing description. It should be understood that such modifications and improvements have been deleted herein for the sake of conciseness and readability, but are properly within the scope of the following claims.

What is claimed is:

1. A combination beverage container and beverage ingredient holder comprising:
    a) a beverage reservoir having a continuous cylindrical side wall with upper and lower rims, and a bottom wall extending across the lower rim of said side wall;
    b) a first beverage ingredient carrier having a carrier wall with first and second ends, inner and outer surfaces, and a plurality of beverage ingredient pockets on the inner surface of said carrier wall;
    c) a hinge securing the first end of said carrier wall to said reservoir side wall; and
    d) an annular cap attached to the upper rim of said side wall, said cap having a central opening.

2. The combination beverage container and beverage ingredient holder of claim 1, wherein said hinge is a living hinge.

3. The combination beverage container and beverage ingredient holder of claim 1, further including a handle extending outwardly from said reservoir side wall.

4. The combination beverage container and beverage ingredient holder of claim 1, further including a mounting member extending outwardly from said reservoir side wall, said hinge being secured between said mounting member and the first end of said carrier wall.

5. The combination beverage container and beverage ingredient holder of claim 1, wherein said reservoir side wall has a given radius of curvature, and said pockets having concave inner walls corresponding to said radius of curvature.

6. The combination beverage container and beverage ingredient holder of claim 1, further including a latch releasably attaching the second end of said carrier wall to said reservoir side wall.

7. A combination beverage container and beverage ingredient holder comprising:

a) a cylindrical side wall with upper and lower rims;

b) a base extending across the lower rim of said side wall;

c) an annular cap attached to the upper rim of said cylindrical side wall, said cap having a central opening;

d) a first elongated, vertical mounting member attached to said side wall;

e) a second elongated, vertical mounting member attached to said side wall on the opposite side of said side wall from said first mounting member;

f) first and second beverage ingredient carriers on opposite sides of said cylindrical side wall, each carrier having a carrier wall with first and second ends, each of said carrier walls having an inner surface with a plurality of beverage ingredient pockets on said inner surface;

g) first and second hinges securing the first ends of said carrier walls to said first mounting member; and h) first and second latches releasably attaching the second ends of said carrier walls to said second mounting member.

8. The combination beverage container and beverage ingredient holder of claim 7, wherein said hinges are living hinges.

9. The combination beverage container and beverage ingredient holder of claim 7, further including a handle extending outwardly from said reservoir side wall.

10. The combination beverage container and beverage ingredient holder of claim 7, wherein said reservoir side wall has a given radius of curvature, said pockets having concave inner walls corresponding to said radius of curvature.

11. The combination beverage container and beverage ingredient holder of claim 7, wherein said cap, base, and carrier walls have outer peripheries of the same diameter.

12. A combination beverage container and beverage ingredient holder comprising:

a) a cylindrical side wall with upper and lower rims;

b) a base extending across the lower rim of said side wall;

c) an annular cap attached to the upper rim of said cylindrical side wall, said cap having a central opening;

d) a first elongated, vertical mounting member attached to said side wall;

e) a second elongated, vertical mounting member attached to said side wall on the opposite side of said side wall from said first mounting member;

f) first and second beverage ingredient carriers on opposite sides of said cylindrical side wall, each carrier having a carrier wall with first and second ends, each of said carrier walls having an inner surface with a plurality of beverage ingredient pockets on said inner surface;

g) a first and second living hinges securing the first ends of said carrier walls to said first mounting member, said live hinges being integrally formed with said carrier walls:

h) first and second latches releasably attaching the second ends of said carrier walls to said second mounting member; and i) a handle extending outwardly from one of said mounting members.

* * * * *